US008788429B2

(12) United States Patent
Tieken

(10) Patent No.: US 8,788,429 B2
(45) Date of Patent: Jul. 22, 2014

(54) SECURE TRANSACTION MANAGEMENT

(75) Inventor: Craig A. Tieken, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1027 days.

(21) Appl. No.: 12/649,625

(22) Filed: Dec. 30, 2009

(65) Prior Publication Data

US 2011/0161233 A1 Jun. 30, 2011

(51) Int. Cl.
*G06Q 99/00* (2006.01)
*G06Q 40/02* (2012.01)
*G06Q 40/00* (2012.01)

(52) U.S. Cl.
CPC .............. *G06Q 40/02* (2013.01); *G06Q 40/00* (2013.01)
USPC ................................. 705/75; 705/35; 705/79

(58) Field of Classification Search
USPC .................... 705/65, 67, 35, 75, 79
See application file for complete search history.

(56) References Cited

U.S. PATENT DOCUMENTS

| | | | | |
|---|---|---|---|---|
| 4,799,156 A * | 1/1989 | Shavit et al. | ................ | 705/26.3 |
| 4,947,028 A * | 8/1990 | Gorog | ........................... | 235/380 |
| 5,495,533 A * | 2/1996 | Linehan et al. | ............... | 713/155 |
| 5,557,518 A * | 9/1996 | Rosen | ............................. | 705/69 |
| 5,590,197 A * | 12/1996 | Chen et al. | ...................... | 705/65 |
| 5,594,796 A * | 1/1997 | Grube et al. | .................. | 380/270 |
| 5,621,797 A * | 4/1997 | Rosen | ............................. | 705/76 |
| 5,642,419 A * | 6/1997 | Rosen | ............................. | 705/76 |
| 5,671,279 A * | 9/1997 | Elgamal | ......................... | 705/79 |
| 5,677,955 A * | 10/1997 | Doggett et al. | ................. | 705/76 |
| 5,703,949 A * | 12/1997 | Rosen | ............................. | 705/65 |
| 5,715,314 A * | 2/1998 | Payne et al. | ..................... | 705/78 |
| 5,724,424 A * | 3/1998 | Gifford | ........................... | 705/79 |
| 5,744,787 A * | 4/1998 | Teicher | ........................ | 235/380 |
| 5,757,917 A * | 5/1998 | Rose et al. | ..................... | 705/79 |
| 5,790,025 A * | 8/1998 | Amer et al. | .................... | 340/571 |
| 5,790,677 A * | 8/1998 | Fox et al. | ........................ | 705/78 |
| 5,805,798 A * | 9/1998 | Kearns et al. | ................... | 714/48 |
| 5,812,776 A * | 9/1998 | Gifford | ........................ | 709/217 |
| 5,822,737 A * | 10/1998 | Ogram | ........................ | 705/14.4 |
| 5,825,881 A * | 10/1998 | Colvin, Sr. | ..................... | 705/78 |
| 5,826,242 A * | 10/1998 | Montulli | ...................... | 705/26.8 |
| 5,826,245 A * | 10/1998 | Sandberg-Diment | ........... | 705/44 |
| 5,850,446 A * | 12/1998 | Berger et al. | ................... | 705/79 |
| 5,930,777 A * | 7/1999 | Barber | ........................... | 705/40 |
| 5,974,146 A * | 10/1999 | Randle et al. | ................... | 705/77 |
| 5,991,750 A * | 11/1999 | Watson | ........................... | 705/44 |
| 6,014,636 A * | 1/2000 | Reeder | ........................... | 705/17 |
| 6,016,484 A * | 1/2000 | Williams et al. | ............... | 705/39 |
| 6,023,682 A * | 2/2000 | Checchio | ........................ | 705/18 |
| 6,029,150 A * | 2/2000 | Kravitz | ........................... | 705/39 |
| 6,049,785 A * | 4/2000 | Gifford | ........................... | 705/39 |
| 6,058,381 A * | 5/2000 | Nelson | ........................... | 705/40 |
| 6,163,771 A * | 12/2000 | Walker et al. | ................... | 705/18 |

(Continued)

*Primary Examiner* — James D Nigh
(74) *Attorney, Agent, or Firm* — Kilpatrick Townsend & Stockton LLP

(57) ABSTRACT

Methods, systems, and devices for secure transaction management are provided. Embodiments include a method for providing secure transactions that include receiving an identifier of a financial account at a payment processor system. A token may be generated that is linked with the identifier of the financial account at the payment processor system. The identifier of the financial account and the token may be stored securely at the payment processor system. The token may be transmitted without the identifier of the financial account to at least a recipient system or a recipient device where the token replaces the identifier of the financial account.

21 Claims, 4 Drawing Sheets

(56) References Cited

U.S. PATENT DOCUMENTS

| | | | |
|---|---|---|---|
| 6,931,382 B2* | 8/2005 | Laage et al. | 705/67 |
| 6,941,285 B2* | 9/2005 | Sarcanin | 705/67 |
| RE40,444 E* | 7/2008 | Linehan | 705/65 |
| 7,707,120 B2* | 4/2010 | Dominguez et al. | 705/78 |
| 7,827,101 B2* | 11/2010 | Mascavage, III | 705/39 |
| 8,099,368 B2* | 1/2012 | Coulter et al. | 705/67 |
| 2002/0138445 A1* | 9/2002 | Laage et al. | 705/67 |
| 2003/0145205 A1* | 7/2003 | Sarcanin | 713/172 |
| 2005/0246292 A1* | 11/2005 | Sarcanin | 705/67 |
| 2007/0198432 A1* | 8/2007 | Pitroda et al. | 705/64 |
| 2009/0210347 A1* | 8/2009 | Sarcanin | 705/67 |
| 2010/0121767 A1* | 5/2010 | Coulter et al. | 705/67 |

* cited by examiner

SECURE TRANSACTION MANAGEMENT

BACKGROUND

This application generally relates to methods, systems, and devices for secure transactions. In particular, embodiments relate to protecting sensitive transaction data using tokenization processes.

More than 280 million payment card records were breached in 2008 alone, and a large percentage of those stolen records were used fraudulently. In fact, the underground economy is teeming with stolen payment card data. Some controls are in place to help card payment processors prevent credit card fraud through increased controls around data and by limiting potential exposure to compromised information records. The Payment Card Industry Data Security Standards (PCI DSS), for example, are widely considered to be a worldwide set of best practices for securing sensitive data. PCI DSS procedures are an essential component in any merchant's holistic risk management program—but they are not without their burdens and limitations.

Merchants have spent more than a billion dollars collectively on PCI DSS compliance as part of their security systems. Indeed, PCI DSS compliance is a resource intensive challenge to businesses of all sizes. According to the analyst firm Gartner, a Level 1 merchant (generally defined as a merchant that annually processes 6 million or more credit card transactions) might spend millions of dollars to initially meet the security requirements prescribed by the PCI Security Standards Council (PCI SSC). Even a Level 4 merchant (commonly defined as a merchant that annually processes less than 20,000 eCommerce or 1 million credit card transactions) might have to spend several thousand dollars on the initial security assessment and new technology and security measures. And meeting the security requirements is just the start; maintaining PCI DSS compliance is a continuous process that requires constant vigilance and incurs ongoing costs.

Despite enormous efforts and vast expenditures since Dec. 2004 when the security standards were first released, hundreds of millions of records with sensitive information have been breached. This clearly indicates that many merchants still have work to do to fully implement standard security procedures and technologies to thwart theft of cardholder data.

In recent years, larger merchants have begun implementing data encryption as a way to protect cardholder data. One of the other aspects of an encryption solution that is often overlooked is that of key management. With an encryption solution, card data may still be present within a merchant's system, protected by encryption. The security of the keys used to perform that encryption is just as vital as securing the data itself. The use of symmetric encryption algorithms (where the same key can be used to encrypt and decrypt data) by most solutions requires vigilant protection of keys, lest they be compromised. "Identity based" key derivation may remove some of the manual management of keys, but does not remove the risk of key theft or compromise. Poor key management practices risk the compromise of the data, or potential data loss if keys are "lost."

There is thus a need for methods, systems, and devices that allow for secure transactions that may not require entities such as merchants and service providers to maintain sensitive financial data, either in encrypted or unecrypted form.

BRIEF SUMMARY

Embodiments address these needs using tokenization processes that payment processors may provide. For example, a customer may initiate a transaction through providing transaction card number, such as a credit card number. This may be done in numerous ways including via a swipe of the card, a contactless reading of the card, or a card not present (CNP) data entry, merely by way of example. A merchant or service provider may capture and encrypt the card data, which may include an identifier of a financial account such as a primary account number (PAN), and any other sensitive data associated with the financial account. The identifier may be encrypted at the point of sale for the time where it may be transmitted to a payment processor. The merchant may then transit the encrypted identifier to the payment processor.

In some embodiments, the payment processor may decrypt the data and send it via a secure channel to an appropriate network or association for authorization at a financial institution or issuer. The payment processor may also generate a new token or retrieve an existing token that is linked with the identifier of the financial account.

In some embodiments, when the transaction is authorized for payment, the authorization may be sent back to the payment processor. The payment processor may then replace the identifier of the financial account with the token and send the outbound transaction response to the merchant. As a result, no sensitive data may be going back to the merchant as the token may not be utilized to initiate a new transaction.

The merchant or service provider may receive the transaction authorization. It may then delete the identifier of the financial account and all other sensitive data associated with the financial account, even if it is encrypted, and retain the token in its place. The merchant or service provider may store the token for numerous purposes, including, but not limited to, settlement, reconciliation, and chargebacks. The tokens along with other related transaction data may be used also for analytics and anti-fraud measures. If the tokens are intercepted or stolen, they may have no value to the thief, since they may not be used to initiate a financial transaction.

Embodiments may include a method for providing secure transactions that include receiving an identifier of a financial account at a payment processor system. A token may be generated that is linked with the identifier of the financial account at the payment processor system. The identifier of the financial account and the token may be stored securely at the payment processor system. The token may be transmitted without the identifier of the financial account to at least a recipient system or a recipient device where the token replaces the identifier of the financial account.

Embodiments may include a point-of-sale terminal for performing secure transactions. The terminal may include an input component for receiving an identifier of a financial account. The terminal may include a processor communicatively coupled with the input component. The terminal may include an output component communicatively coupled with the processor. The terminal may include a memory communicatively coupled with and readable by the processor. The memory may store therein a series of instructions which, when executed by the processor, cause the processor to: detect reception of the identifier of the financial account; transmit the identifier of the financial account to the output component for transmission to a payment processor system; detect reception of a token from the payment processor system; and replace the identifier of the financial account with the token.

Some embodiments may include a system for performing secure transactions. The system may include a storage medium. The system may include a processor coupled with the storage medium. The processor may be configured to secure a financial transaction by a configuration to: receive an identifier of a financial account at a payment processor system; generate a token linked with the identifier of the financial account at the payment processor system; store the identifier of the financial account and the token securely at the payment processor system; and transmit the token without the identifier of the financial account to at least a recipient system or a recipient device where the token replaces the identifier of the financial account

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
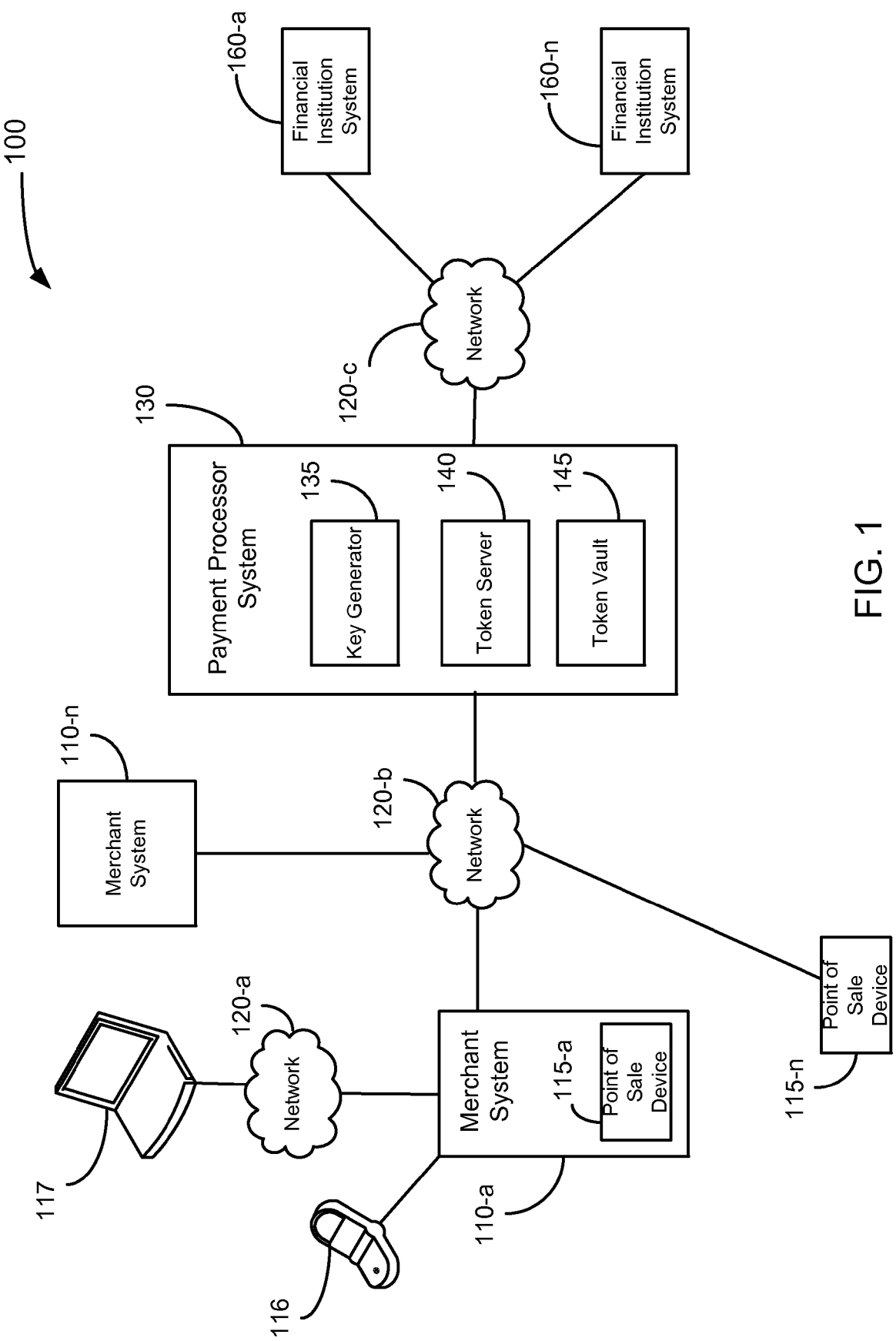
FIG. 1 illustrates a system capable of performing secure transactions in accordance with various embodiments.

Embodiments provide various ways to perform secure transactions. A customer may make a purchase from a merchant using a financial instrument, such as a credit card, debit card, stored value card, or the like. The merchant may capture a primary account number (PAN) associated with the financial instrument using a point-of-sale device such as a magnetic strip reader (MSR). The primary account number may be encrypted at the MSR or other point within the merchant's system. The merchant may then transmit the primary account number, or identifier of a financial account in general, to a payment processor.

A payment processor may decrypt the data received from the merchant in order to determine the identifier of the financial account. The merchant may transmit the identifier of the financial account to an issuer, who may then provide an authorization to the payment processor. In addition, the payment processor may create or retrieve a token that may be used to replace the identifier of the financial account within the merchant's system. The payment processor may securely store the token along with the identifier of the financial account in a location different from the merchant's system. The payment processor may then transmit the token, along with the authorization in some cases, to the merchant. The merchant may then replace the identifier of the account, such as the primary account number, on its system with the token. The token may not be used to initiate a new transaction, such as a new purchase. However, the token may be utilized for other purposes, such as transaction refunds, transaction settlements, and transaction adjustments, merely by way of example. Furthermore, a merchant may utilize the token associate with a customer's purchases provide analytics regarding customer purchases. It may also be used for anti-fraud purposes, merely by way of example.

Embodiments may have other benefits. For example, a merchant may not need to store sensitive financial information from a customer, such as a primary account number, on its system. As a result, a merchant may not have to take on the added costs associated with securely store financial account information of customers in order to comply with PCI DSS. Furthermore, a merchant may A token may be used to protective sensitive financial data, such as a financial instrument account number or an identifier of a financial account in general. A token may be referred to as an alias in some embodiments. A token may be used as a substitute for an identifier of a financial account.

In some embodiments, a token may be a random number associated with an identifier of a financial account. A token may be a random unique number. A token may include the same number of digits as the identifier of the financial account that it substitutes for. In some embodiments, a token may include several digits that are the same as identifier. Merely by way of example, a token may end with the same last four digits of the associated identifier of a financial account. For example, if the identifier was credit card number with 16 digits, ending in four digits such as 2134, then an associated token may also end with the digits 2134 along with spanning 16 digits. Some embodiments may include tokens that include other sequences of numbers that may help identify the token as being associated with a specific identifier of a financial account without revealing the identifier. Some embodiments may include tokens that have more or less digits than the identifier of the financial account In some embodiments, the process of tokenization may be static or dynamic. In embodiments with static tokenization, a specific token may be assigned to a specific identifier of a financial account that may then be repeatedly used. A static token may allow for analysis to be done regarding the use of a specific identifier without revealing the specific identifier. For example, a static token may be used to determine spending patterns and fraud analysis. In some embodiments, a static token may also be used for credit analysis.

Some embodiments may utilize a dynamic tokenization process. A dynamic tokenization process may involve creating multiple tokens for a specific identifier of a financial account. For example, a new token may be generated for each use of a specific identifier. In some embodiments, a specific token may be generated for a specific identifier of a financial account for a specific merchant, service provider, or other entity.

Some embodiments may utilize encryption. A identifier of a financial account may be encrypted at a merchant or service provider's system. A point-of-sale device may encrypt the identifier of the financial account. A magnetic strip reader may encrypt the data in some embodiments.

Encryption may utilize public and/or private keys. In one embodiment, a payment processor may provide a public key to a merchant's system that may be used to encrypt data sent to the payment processor. The payment processor may replace the public keys at different times in some embodiments. With a public key infrastructure (PKI), a payment processor would provide public keys for others to use, while retaining a private key that may be used to decrypt data that has been encrypted with the public key. Such PKI systems are sometimes referred to asymmetric. Some embodiments may utilize RSA encryption.

Some embodiments may utilize other forms of keys to encrypt data sent from a merchant to a payment processor. In these cases, a merchant and processor may have an encryption key that it uses to both encrypt and decrypt data. Such a system may be referred to as symmetric encryption.

A simplified embodiment of a system 100 capable of conducting secure transactions is illustrated in FIG. 1. Such a system may include one or more merchant or service providers systems 110, one or more payment processor systems 130, one or more financial institution or issuers systems 160. These systems may be coupled through a variety of networks 120. System 100 may also include consumer devices, such as computer 117 or telephone 116, which may connect with a merchant or service provider system 110.

A merchant or service provider system 110 may include any number of computers and/or servers. Such a system may receive transaction information from consumers at point-of-sale devices, such as point-of-sale device 115. Data received from point-of-sale device 115 or merchant system 110 in general may be processed, stored, and/or routed over network 120-a to payment processor system 130. Network 120-a may be a private network, such as a private intranet operated by the payment processor or may be a public network, such as the Internet, merely by way of example. Data routed over network 120-a may be encrypted. In some embodiments, data may be encrypted with a public key. In other embodiments, data may be encrypted with other forms of key, such as a symmetric key, merely by way of example.

Merchant or service provider's point-of-sale device 115 may be capable of receiving transaction data from transaction cards stored in the form of machine readable data. Transaction cards may include, but are not limited to, credit cards, debit cards, stored value cards, and gift cards. Some embodiments may be able to hand other financial instruments, such as checks for example. Such data may be stored in a magnetic strip, barcode, and/or any other computer readable storage medium. Transaction data may also include an identifier of an account, such as a primary account number. Such account identifiers may often be printed on the front of a financial instrument such as a transaction card or check. The data may in general include information identifying an account held by a consumer. Such forms of data may require the transaction card be swiped through a card reader, such as a magnetic strip reader. In some embodiments, data may be entered into merchant or service provider system through other means, such as manually or through a network coupled with merchant system 110. In some embodiments, the data from transmitted wirelessly to point-of-sale device 115 or merchant system 110. For example, an RFID tag (not shown) may include and transmit RFID information similar to that stored on a machine-readable transaction card, possibly including an account number of a consumer.

In some embodiments, merchant system 110 may communicate with a consumer device such as computer 117 or telephone 116 to receive transaction data such as an identifier of a consumer account. Merely by way of example, a consumer may enter an identifier of an account, such as a credit card account, at a consumer's phone 116 or computer 177. The identifier may be transmitted to merchant system 110. In some embodiments, the information may be protected via an secure sockets layer (SSL) connection over network 120-b established between consumer computer 117 and merchant system 110. Other secure connections may also be used including, but not limited to, transport layer security (TLS).

Merchant system 110 may also receive data over network 115-a from payment processor system 130. This may include receiving tokens as discussed more thoroughly throughout this application. Merchant system 110 may store tokens, merely by of example, in place of the associated identifier of a consumer's financial account. Such tokens and related transaction data may be used by the merchant for different purposes including, but not limited to, transaction logs, settlements, data warehousing, analytics, and/or anti-fraud measures.

Payment processor system 130 may include a number of computers, databases, and/or servers. Such as system may be used to receive transaction data, including transaction data from merchant systems 110. For example, merchant system 110 and/or point-of-sale device may transmit data to payment processor system 130 regarding a transaction utilizing an identifier of a consumer account, such as a credit card account number, merely by way of example. Payment processor system 130 may receive the data over network 120-b. In some embodiments, the data may be transmitted to payment processor system 130 by other means. Merely by way of example, the data may be entered into payment processor 130 through an agent of the payment processor who may receive the data from the merchant system or an agent of the merchant, such as through a telephone call.

Payment processor system 130 may decrypt data received from merchant system 110 in some cases. Data may be encrypted using public and/or private keys. In some embodiments, payment processor system 130 includes a key generator 135 that may generate both public and private keys, as well as other forms of keys. Payment processor system may transmit public keys to merchant system 110, which merchant system may then utilize to encrypt data sent to payment processor system 130. In some embodiments, payment processor system may transmit public and/or private keys to other systems, such as financial institution systems 160

Payment processor system 130 may include computers and/or servers that may forward data received from merchant system 110 in order to receive authorization for a transaction. For example, payment processor system 130 may transmit an authorization request to financial institution systems 160 and/or issuer systems. For example, payment processor system 130 may receive transaction data from merchant system 130 involving a transaction with a customer with an account at a specific financial institution. Payment processor system 130 may then send an authorization request to the specific financial institution system 160 seeking authorization for a transaction. Such authorizations may be transmitted over network 120-c. Network 120-c may be a private network, such as a private intranet operated by the payment processor or may be a public network, such as the Internet, merely by way of example. Data routed over network 120-c may be encrypted. In some embodiments, data may be encrypted with a public key. In other embodiments, data may be encrypted with other forms of keys, such as symmetric keys, merely by way of example. Payment processor system 130 may receive authorization results, such as a transaction is authorized or a transaction is not authorized, from financial institution systems 160. Payment processor system 130 may then transmit the authorization result to the merchant system that transmitted the original transaction data to the payment processor system 130.

Payment processor system 130 may also include a means to produce tokens that may be used to represent identifiers of accounts, such as credit card account numbers and other transaction cards, merely by way of example. Such tokens may be generated by different computers and/or servers within payment processor system 130. In some embodiments, payment processor system 130 may include a token server 140 that may produce tokens to represent identifiers of financial accounts.

Payment processor system 130 may also include a database that may be used to store tokens that are linked with their respective identifiers of accounts. Such databases may be a token database or token vault 145. Token vault 145 may be secured such that the payment processor may maintain control over the data stored within token vault 145. In some embodiments, token vault 145 may be controlled by a third party that may maintain security over the data stored on token vault 145. In some embodiments, a merchant may request data from the payment processor. Merely by way of example, merchant system 110 that has received tokens to replace identifiers of financial accounts on merchant system 110 may request payment processor system 130 to transmit an identifier of a financial account when merchant system 110 provides an associated token.

In some embodiments, payment processor system 130 may also include computers and/or servers that may be utilized for recurring billing systems or data vaults for repeat customer information. These computers and/or servers may be separate or part of the other computers and/servers that make up the payment processor system 130.

Financial institution system 160 may be any number of computers and/or servers. Financial institution system 160 may also be an issuer system. Financial institutions, such as banks, merely by way of example, and/or issuers may in general be entities that provide different financial accounts with associated identifiers, such as a credit card number, merely by way of example. Financial institution system 160 may communicate with one or more merchant or service provider systems to authorize and/or settle financial transactions. Financial institution system 160 may maintain in one or more databases (not shown) various account information for customers. Such accounts may be any type of account, such as credit card accounts, debit card accounts, prepaid/stored value accounts, gift accounts, etc. Financial institution system 160 may also be able to contact other financial institutions to authorize and/or settle financial transactions for accounts not held by the entity maintaining financial institution system 160. For example, a merchant or service provider may contract with the entity operating financial institution system 160 to handle all of the merchant or service provider's electronic transactions, merely by way of example. These transactions may be routed over a public network or a private network, possibly maintained by the same entity managing financial institution system 160, to the financial institution system 160 for either authorization and/or settlement, or routing to an appropriate third-party financial institution.

Some embodiments may include a point-of-sale device or terminal such as 115 for performing secure transactions. The terminal may include an input component for receiving an identifier of a financial account. The terminal may include a processor communicatively coupled with the input component. The terminal may include an output component communicatively coupled with the processor. The terminal may include a memory communicatively coupled with and readable by the processor. The memory may store therein a series of instructions which, when executed by the processor, cause the processor to: detect reception of the identifier of the financial account; transmit the identifier of the financial account to the output component for transmission to a payment processor system; detect reception of a token from the payment processor system; and replace the identifier of the financial account with the token.

Figure 2:
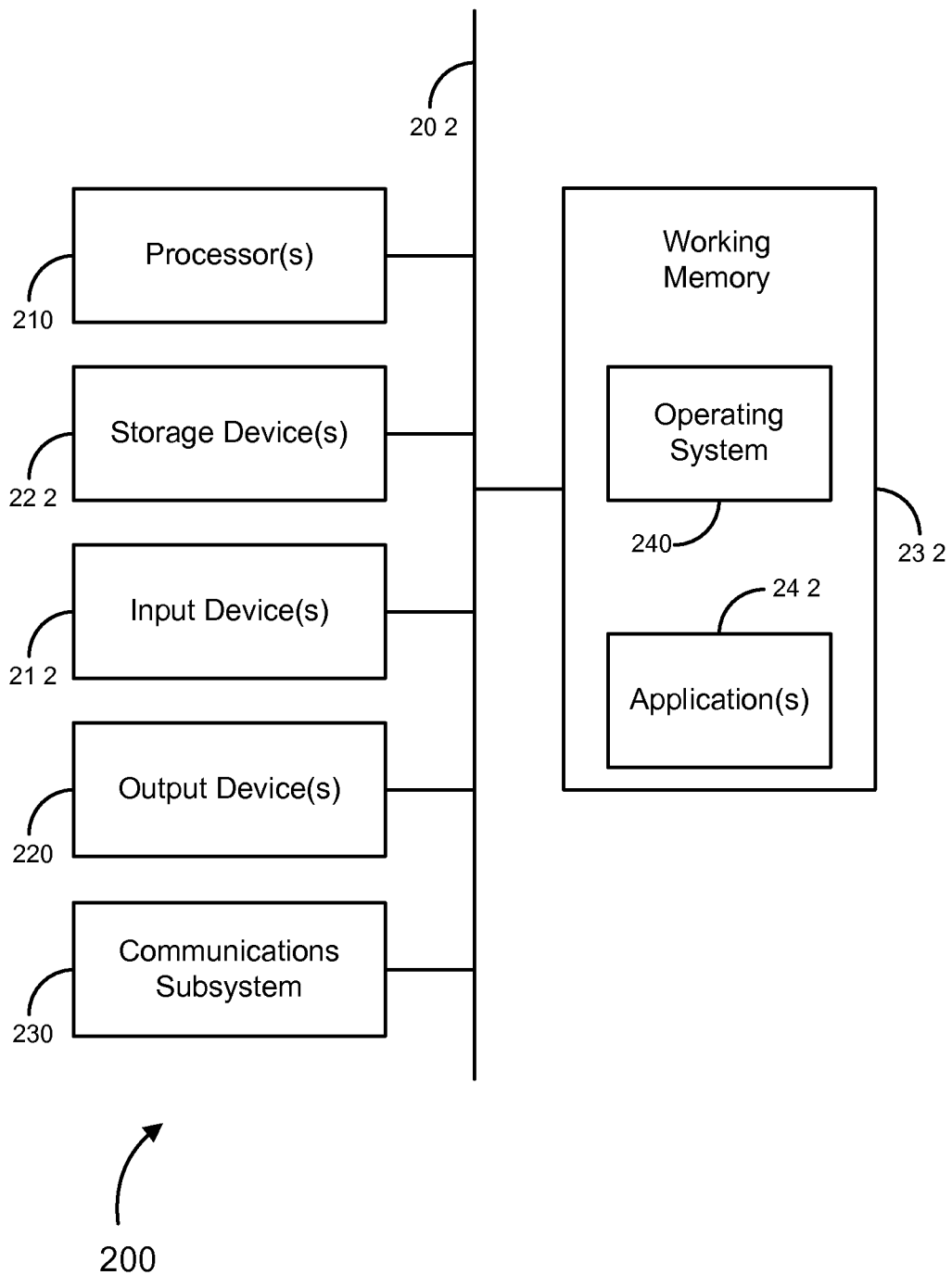
FIG. 2 provides a schematic illustration of a computer system in accordance with various embodiments.

FIG. 2 provides a schematic illustration of one embodiment of a computer system 200 that perform the methods provided by various other embodiments, as described herein, and/or can function as the computer systems for the financial institution, merchant, service provider, and payment processor as described in association with FIG. 1. It should be noted that FIG. 2 is meant only to provide a generalized illustration of various components, any or all of which may be utilized as appropriate. FIG. 2, therefore, broadly illustrates how individual system elements may be implemented in a relatively separated or relatively more integrated manner.

The computer system 200 is shown comprising hardware elements that can be electrically coupled via a bus 202 (or may otherwise be in communication, as appropriate). The hardware elements may include one or more processors 210, including without limitation one or more general-purpose processors and/or one or more special-purpose processors (such as digital signal processing chips, graphics acceleration processors, and/or the like); one or more input devices 212, which can include without limitation a mouse, a keyboard and/or the like; and one or more output devices 220, which can include without limitation a display device, a printer and/or the like.

The computer system 200 may further include (and/or be in communication with) one or more storage devices 222, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 200 might also include a communications subsystem 230, which can include without limitation a modem, a network card (wireless or wired), an infra-red communication device, a wireless communication device and/or chipset (such as a 802.11 device, a WiFi device, a WiMax device, cellular communication facilities, etc.), and/or the like. The communications subsystem 230 may permit data to be exchanged with a network (such as the network described below, to name one example), other computer systems, and/or any other devices described herein. In many embodiments, the computer system 200 will further comprise a working memory 232, which can include a RAM or ROM device, as described above.

The computer system 200 also can comprise software elements, shown as being currently located within the working memory 232, including an operating system 240, device drivers, executable libraries, and/or other code, such as one or more application programs 242, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 222 described above. In some cases, the storage medium might be incorporated within a computer system, such as the system 200. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 200 and/or might take the form of source and/or installable code, which, upon compilation and/or installation on the computer system 200 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 200) to perform methods in accordance with various embodiments of the invention. According to a set of embodiments, some or all of the procedures of such methods are performed by the computer system 200 in response to processor 210 executing one or more sequences of one or more instructions (which might be incorporated into the operating system 240 and/or other code, such as an application program 242) contained in the working memory 232. Such instructions may be read into the working memory 232 from another computer readable medium, such as one or more of the storage device(s) 222. Merely by way of example, execution of the sequences of instructions contained in the working memory 235 might cause the processor(s) 210 to perform one or more procedures of the methods described herein.

The terms "machine-readable storage medium," "machine-readable medium," and "computer readable medium," as used herein, refer to any medium that participates in providing data that causes a machine to operation in a specific fashion. In an embodiment implemented using the computer system 200, various computer readable media might be involved in providing instructions/code to processor (s) 210 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 225. Volatile media includes, without limitation, dynamic memory, such as the working memory 235. Transmission media includes, without limitation, coaxial cables, copper wire and fiber optics, including the wires that comprise the bus 202, as well as the various components of the communications subsystem 230 (and/or the media by which the communications subsystem 230 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 200. These signals, which might be in the form of electromagnetic signals, acoustic signals, optical signals and/or the like, are all examples of carrier waves on which instructions can be encoded, in accordance with various embodiments of the invention.

The communications subsystem 230 (and/or components thereof) generally will receive the signals, and the bus 202 then might carry the signals (and/or the data, instructions, etc. carried by the signals) to the working memory 232, from which the processor(s) 210 retrieves and executes the instructions. The instructions received by the working memory 232 may optionally be stored on a storage device 222 either before or after execution by the processor(s) 210.

Figure 3:
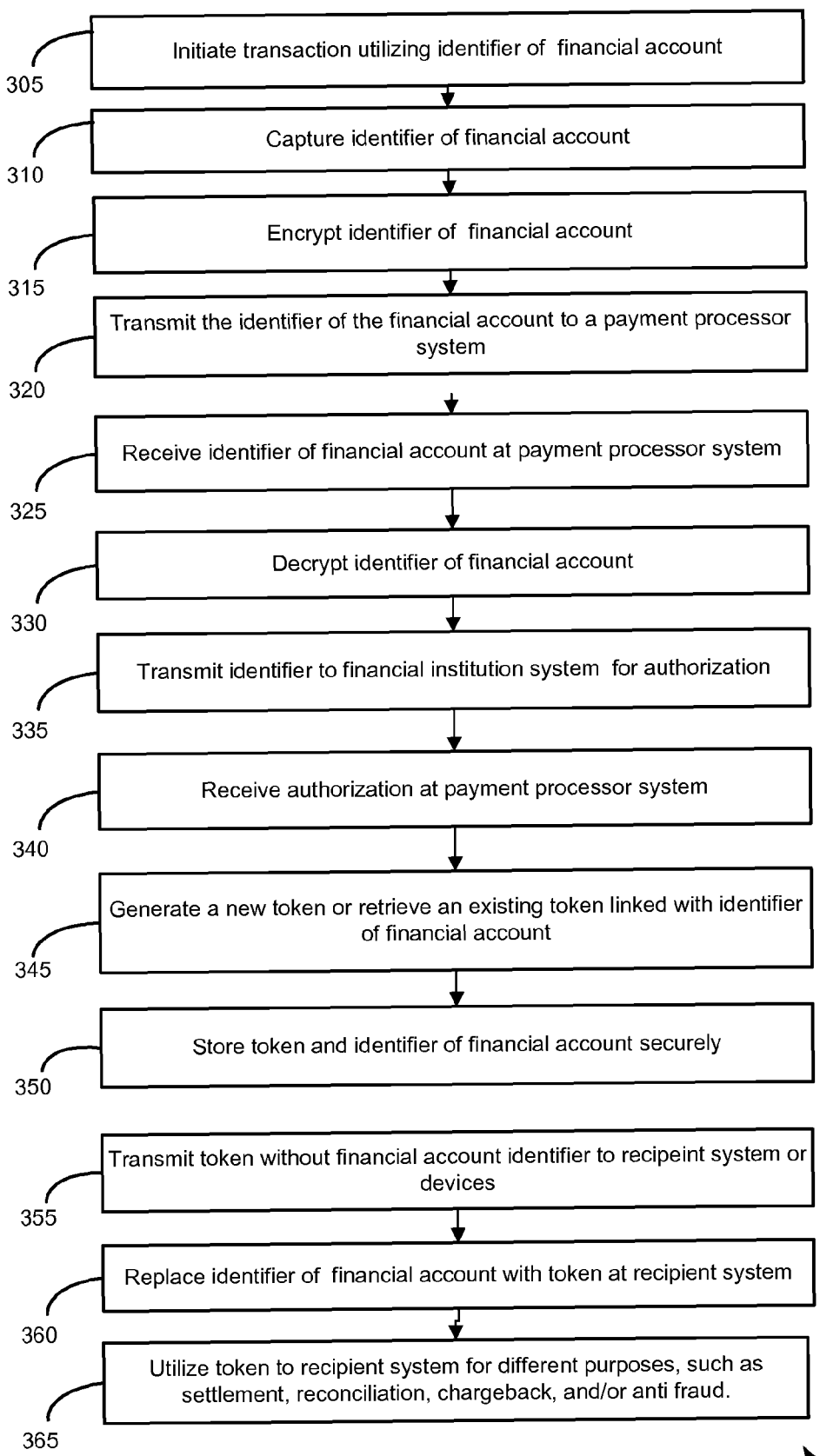
FIG. 3 illustrates a flow diagram of a method for performing secure transactions in accordance with various embodiments.

FIG. 3 illustrates a simplified version of a method 300 for providing secure transactions in accordance with various embodiments. Method 300 may be provided on systems such as system 100 of FIG. 1, merely by way of example. At block 305, a transaction may be initiated using an identifier of a financial account. The identifier may include, but is not limited to, a credit card account number, a debit card account number, a checking card account number, stored value account card number, or a check account number. In some embodiments, the transaction may be initiated at a system, such as merchant or service provider system 110 of FIG. 1. The transaction may be initiated at a point-of-sale device at a merchant. In these cases, a transaction card or instrument may be presented to the merchant, merchant system, and/or point-of-sale device. In some embodiments, a transaction card or instrument may not be present at a merchant system. For example, a consumer may initiate a transaction using a consumer's computer or telephone. In some embodiments, the identifier of a financial account may be entered by a consumer into such a device. In some embodiments, the identifier of the financial account may then be transmitted to a system, such as a merchant system via a network, which may be a public network such as the Internet or a private network. In some embodiments, the identifier may be protect using a secure socket layer (SSL) connection established between a consumer's computer and a merchant system.

At block 310, the identifier of the financial account may be captured. For example, the identifier may be captured at a merchant system, which may include a point-of-sale device. In some embodiments, the identifier may be captured using a magnetic strip reader (MSR). Along with the identifier of the financial account, such as primary account number, other information may be captured. Such information may include, but is not limited, track data from a magnetic strip, expiration dates for transaction instruments, and/or transaction accounts.

At block 315, the identifier of the financial account may be encrypted. In some embodiments, the identifier may be encrypted with a public key. A public key may be provided by an entity that is to receive the identifier, such as a payment processor. The public key may have an associated private key that is retained by payment processor system. Such encryption may be referred to as asymmetric encryption. An example of asymmetric encryption is RSA encryption. A payment processor system may distribute one or more public keys that may be used by systems or devices, such as merchant system or device, to encrypt data that then be sent securely to the payment processor system. Some embodiments may utilize other forms of keys, which each system utilizes the same key to encrypt and decrypt data such as identifiers of financial accounts. Such systems may be referred to as symmetric encryption. Symmetric encryption may require that each system, such as a merchant system, securely store its private key to avoid compromising the security of the encrypted data. Some embodiments may utilize a combination of both asymmetric and symmetric encryption. In some embodiments, an identifier of a financial account may be encrypted at a point-of-sale device or merchant/service provider system as soon as it is captured.

At block 320, the identifier of the financial account may be transmitted to a payment processor system. In some embodiments, the identifier may be transmitted over a network. The network may be a private network, such as a private intranet operated by the payment processor or may be a public network, such as the Internet, merely by way of example. In some embodiments, the data may be transmitted to payment processor system by other means. Merely by way of example, the data may be entered into a payment processor system through an agent of the payment processor who may receive the data from the merchant system or an agent of the merchant, such as through a telephone call.

At block 325, the identifier of the financial account may be received, such as at a payment processor system. A payment processor system may do a variety of actions with respect to receiving the identifier of the financial account. For example, if the identifier of the financial account has been encrypted, the payment processor system may decrypt the data as seen in block 330. A payment processor may also transmit the identifier to an appropriate financial institution or issuer system associated with the identifier to seek authorization of a transaction, as seen in block 335. Payment processor system may also receive an authorization (or denial of authorization) from the financial institution system as seen in block 340.

At block 345, a token may be generated to replace the identifier of the financial account within some systems, such as a merchant system, service provider system, or a financial institution/issuer system. A payment processor system may generate the token. In some embodiments, a token server may generate the token. In some cases, a token may have already been generated for the identifier. In that case, the token may be retrieved for where it is stored, such as in a token vault or other storage device. In some embodiments, one token may be utilized for a specific identifier of a financial account. In other embodiments, a multiple tokens may be generated for a specific identifier of a financial account. Merely by way of example, a token may be generated for each transaction using a specific identifier.

As discussed above, a token may be used to protect sensitive financial data, such as an identifier of a financial account. An identifier of a financial account may include financial instrument account number such as a credit card number, a debit card number, a stored value card number, merely by way of example. A token may be referred to as an alias in some embodiments. A token may be used as a substitute for the identifier of the financial account.

In some embodiments, a token may be a random number associated with an identifier of a financial account such as a financial instrument account number. A token may be a random unique number. A token may include the same number of digits as the financial instrument account number that it substitutes for. In some embodiments, a token may include several digits that are the same as the financial instrument account number. Merely by way of example, a token may end with the same last four digits of the associated financial instrument account number. For example, if the financial instrument account number was credit card number with 16 digits, ending in four digits such as 2134, then the associated token may also end with the digits 2134 along with spanning 16 digits. Some embodiments may include tokens that include other sequences of numbers that may help identify the token as being associated with a specific financial account instrument number with revealing the financial account instrument number. Some embodiments may include tokens that have more or less digits than the financial account instrument number In some embodiments, the process of tokenization may be static or dynamic. In embodiments with static tokenization, a specific token may be assigned to a specific financial instrument account number that may then be repeatedly used. A static token may allow for analysis to be done regarding the use of a specific financial instrument account number without revealing the specific financial instrument account number. For example, a static token may be used to determine spending patterns, fraud analysis. In some embodiments, a static token may also be used for credit analysis.

Some embodiments may utilize a dynamic tokenization process. A dynamic tokenization process may involve creating multiple tokens for a specific financial instrument account number. For example, a new token may be generated for each use of a specific financial instrument account number. In some embodiments, a specific token may be generated for a specific financial instrument account number for a specific merchant, service provider, or other entity.

At block 350, the token and identifier of the financial account may be stored. A payment processor system may store the token and identifier of the financial account so that the merchant, service provider, or financial institution/issuer does not have to securely store the identifier of the financial account. The token and identifier may be stored such that they are linked, establishing a relationship between the identifier and the token. The token and identifier may be stored on a secured database, such as a token vault. The secured database may be under the control of the payment processor system. The database may be secured in numerous different ways, including through encrypted the data stored on the database to providing password protection for accessing the database. The database may also be restricted in the connections that may be made to the database. For example, the database may only be accessed a private connection, rather than a public connection such as the Internet.

At block 355, a token linked with an identifier of a financial account may be transmitted to a recipient system, such as a merchant system, service provider system, or financial institution/issuer system, merely by way of example. The token may be transmitted without the identifier of the financial account. In some embodiments, the token may be transmitted over a network. The network may be a private network, such as a private intranet operated by the payment processor or may be a public network, such as the Internet, merely by way of example. In some embodiments, the token may be transmitted to a merchant system, service provider system, or financial institution/issuer system by other means. Merely by way of example, the data may be entered into from an agent of the payment processor who may convey the token to the merchant/service provider/financial institution/issuer system or an agent of the entity, such as through a telephone call. The token may be encrypted in some embodiments, while in other embodiments it may not be encrypted as the token may not be used to initiate a new transaction.

At block 360, the identifier of the financial account may be replaced with the token. This may occur at the systems or devices where the identifier was received or produced, such as the merchant system, service provider system, or financial institution/issuer system. The identifier of the financial account may then be deleted from these systems so that the identifier information does not need to be protected at the receiving system.

At block 365, the token may be used for a variety of purposes by a merchant system, service provider system, or financial institution/issuer system. Merely by way of example, these receiving systems may use the token for purposes including, but not limited to, settlement, reconciliation, adjustment, refunds, and chargeback operations. A receiving system may also use the token along with related transaction data to provide analytical functions, such as studying purchasing habits of customers. The token may also be used for anti-fraud purposes, merely by way of example. The token may also be used for other purposes without compromising the security of the original identifier of the financial account as the identifier no longer needs to be retained on the receiving system or device, such as the merchant/service provider/financial institution systems.

Figure 4:
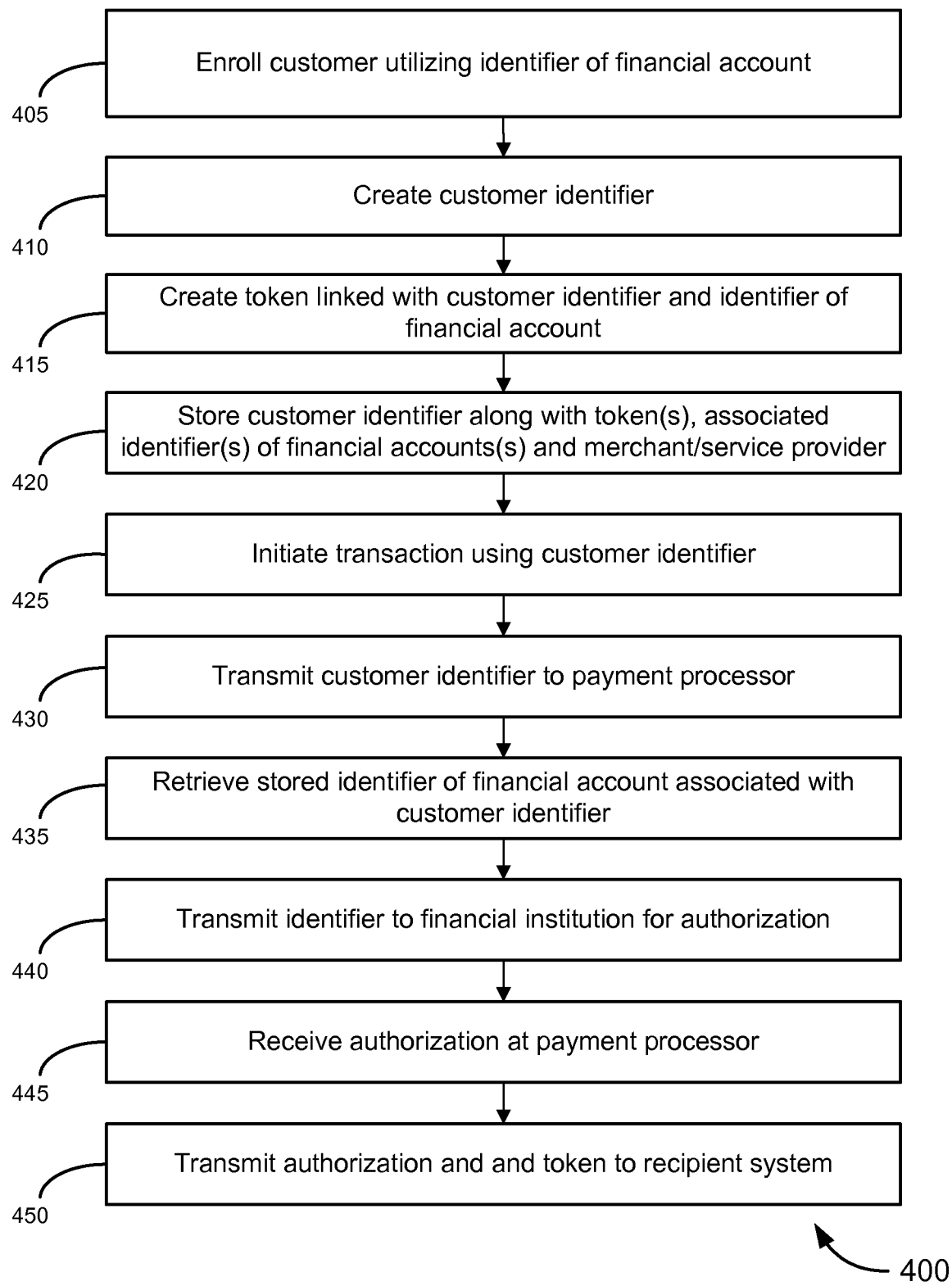
FIG. 4 illustrates a flow diagram of a method for performing secure transactions in accordance with various embodiments.

FIG. 4 illustrates a simplified version of a method 400 for providing secure transactions in accordance with various embodiments. Method 400 may be provided on systems such as system 100 of FIG. 1, merely by way of example. Method 400 may be utilized for embodiments involving recurring payments or repeat customers. Embodiments with repeat customers may be referred to as registered card programs. Method 400 may utilize some or all of the steps or aspects of method 300 of FIG. 3 and thus are not necessarily repeated in detail here. At block 405, a customer may enroll in a recurring payment program or registered card program at a merchant or service provider. The customer may enroll in numerous different ways including at the merchant or service providers location or through different connections such as computer or telephone connection, merely by way of example. The customer may provide one or more identifiers of financial accounts. For example, a customer may provider a credit card number and a debit card number. The customer may provide these identifiers to the merchant or service provider. In some embodiments, the customer may provide these identifiers to a payment processor.

At block 410, a customer identifier may be created. A customer identifier may provide a link or relationship between a specific customer and a specific merchant or service provider. The customer identifier may have one or more financial account identifiers associated with it. In some embodiments, a merchant or service provider may create the customer identifier. In other embodiments, a payment processor may create the customer identifier. If a merchant or service provider creates a customer identifier, the customer identifier along with the associated information identifying the merchant or service provider and the financial account identifier(s) may be transmitted to a payment processor, such as through a network or telephone connection as discussed above.

At block 415, one or more tokens may be created linked with the customer identifier. Merely by way of example, a token may be created by a payment processor system for each financial account identifier associated with the customer identifier. Tokens may be created when the customer enrolls in a recurring payment or registered card program. In some cases, tokens may be created when financial transactions occur.

At block 420, the customer identifier is stored along with the associated financial account identifiers, merchant/service provider information, and/or tokens. These may be securely stored by a payment processor within a payment processor system as discussed above. In some embodiments, the customer identifier and/or the linked information may be stored in a specific recurring billing or registered card system of the payment processor.

At block 425, a transaction may be initiated using the customer identifier. The transaction may be initiated by the customer or the merchant/service provider. This step of initiating a transaction may involve aspects the same as the initiating of a transaction as in method 300 of FIG. 3, where a customer identifier may be used with this method at this point, while in method 300 a financial account identifier may be used.

At block 430, the customer identifier may be transmitted to and received by a payment processor system. Transmitting the customer identifier to a payment processor is similar to transmitting a financial account identifier as seen in method 300 of FIG. 3, and more specifically blocks 315, 320 and 325. For example, the customer identifier may be encrypted as discussed in block 315. The customer identifier may be transmitted to payment processor system in different ways as discussed in block 320. The customer identifier may then be received at the payment processor and decrypted if need be as similarly discussed at block 325 and 330.

At block 435, a stored financial account identifier associated with the customer identifier may be retrieved. In some embodiments where multiple financial account identifiers have been stored linked with a specific customer identifier, a payment processor system may have received information from the customer and/or merchant/service provider regarding a priority regarding which financial account identifier to use. For example, the payment processor system may have information telling the system to first use a credit card number associated with the customer identifier and then try a debit card number if the credit card number is denied authorization. In some embodiments, a token may generated at this point to be associated with the financial account identifier or customer identifier if one has not already been created.

At block 440, the financial account identifier may be transmitted to a respective financial institution/issuer system associated with the financial account identifier for authorization. This is similar to block 335 of FIG. 3. In some embodiments, the token may be transmitted along with or instead of the financial account identifier in cases where the financial institution or issuer system. At block 445, an authorization may be received as seen also with block 340 of FIG. 3. As noted above, if authorization is denied, payment processor system may try using a different financial account identifier associated with the customer identifier if the customer and/or merchant/service provider as provide such additional information regarding other financial account identifiers of the customer.

At block 450, an authorization and a token associated with the customer identifier, and more specifically in some case with a specific financial account identifier, may be transmitted to a recipient system or device, such as a merchant/service provider system or device as also seen with block 355 of FIG. 3. Furthermore, as discussed with block 360 and 365 of method 300 of FIG. 3, the merchant/service provider systems or devices may utilize the token in places where the financial account identifier may normally be utilized. The token and other related transaction information may be used for many different purposes by the merchant/service provider as discussed with block 365 of method 300 of FIG. 3.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. For example, the methods and processes may be implemented using a system, such as system 100 of FIG. 1. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for providing secure transactions, the method comprising:
    receiving an identifier of a financial account at a payment processor system in connection with a purchase transaction;
    transmitting the identifier of the financial account to a financial instrument account issuer system to obtain authorization to use funds associated with the financial account to conduct the purchase transaction;
    receiving an authorization from the financial instrument account issuer system to use funds associated with the financial account to conduct the purchase transaction;
    generating a token linked with the identifier of the financial account at the payment processor system;
    storing the identifier of the financial account and the token securely at the payment processor system; and
    transmitting the token without the identifier of the financial account to at least a recipient system or a recipient device where the token replaces the identifier of the financial account;
    receiving the token without the identifier at the payment processor system along with a request for at least a transaction adjustment, a transaction refund, or a transaction settlement; and
    performing at the payment processor system the request using the token.

2. The method for providing secure transactions of claim 1, wherein the identifier of the financial account is selected from a group consisting of a credit card account number, a debit card account number, a checking account number, and a stored value card account number.

3. The method for providing secure transactions of claim 1, wherein the received identifier of the financial account is encrypted.

4. The method for providing secure transactions of claim 3, further comprising decrypting the encrypted identifier of the financial account using a private key associated with a public key used to encrypt the identifier of the financial account.

5. The method for providing secure transactions of claim 4, further comprising transmitting the public key from the payment processor system to the recipient system or recipient device.

6. The method for providing secure transactions of claim 3, further comprising decrypting the encrypted identifier of the financial account using a symmetric key used to encrypt the identifier.

7. The method for providing secure transactions of claim 1, wherein the token has the same number of digits as the identifier of the financial account.

8. The method for providing secure transactions of claim 1, wherein the token includes a subset of digits that form a sequence of digits that are the same as in the identifier of the financial account.

9. The method for providing secure transactions of claim 8, wherein the subset of digits includes the last four digits of the identifier of the financial account.

10. The method for providing secure transactions of claim 1, wherein a first checksum from the token equals a second checksum from the identifier of the financial account.

11. The method for providing secure transactions of claim 1, wherein the recipient system or the recipient device includes at least a merchant system or a merchant device.

12. The method for providing secure transactions of claim 1, wherein the recipient system or the recipient device includes at least a service provider system or a service provider device.

13. The method for providing secure transactions of claim 1, wherein the recipient system or the recipient device includes at least an identifier of a financial account issuer system or an identifier of a financial account issuer device.

14. The method for providing secure transactions of claim 1, further comprising:
    receiving a customer identifier, wherein the customer identifier links the identifier of the financial account of a customer with a merchant or service provider;
    retrieving the identifier of the financial account; and transmitting the identifier of the financial account to a financial institution system for authorization.

15. A point-of-sale terminal for performing secure transactions, the terminal comprising:
    an input component for receiving an identifier of a financial account;
    a processor communicatively coupled with the input component;
    an output component communicatively coupled with the processor;
    a memory communicatively coupled with and readable by the processor, the memory having stored therein a series of instructions which, when executed by the processor, cause the processor to:
        detect reception of the identifier of the financial account;
        transmit the identifier of the financial account to the output component for transmission to a payment processor system;
        detect reception of a token from the payment processor system; and
        replace the identifier of the financial account with the token.

16. The point-of-sale terminal for performing secure transactions of claim 15, wherein the series of instructions further comprises instructions causing the processor to encrypt the identifier of the financial account.

17. The point-of-sale terminal for performing secure transactions of claim 16, wherein encrypting the identifier of the financial account utilizes an asymmetric key.

18. The point-of-sale terminal for performing secure transactions of claim 17, wherein the series of instructions further comprises instructions causing the processor to store the asymmetric key.

19. The point-of-sale terminal for performing secure transactions of claim 15, wherein the series of instructions further comprises instructions causing the processor initiate at least a transaction adjustment, a transaction refund, or a transaction settlement using the token.

20. A system for performing secure transactions, the system comprising:
    a storage medium;
    a processor coupled with the storage medium, the processor configured to secure a financial transaction by a configuration to:
        receive an identifier of a financial account at a payment processor system in connection with a purchase transaction;
        transmit the identifier of the financial account to a financial instrument account issuer system to obtain authorization to use funds associated with the financial account to conduct the purchase transaction;
        receive an authorization from the financial instrument account issuer system to use funds associated with the financial account to conduct the purchase transaction;
        generate a token linked with the identifier of the financial account at the payment processor system;
        store the identifier of the financial account and the token securely at the payment processor system; and
        transmit the token without the identifier of the financial account to at least a recipient system or a recipient device where the token replaces the identifier of the financial account;
    receive the token without the identifier at the payment processor system along with a request for at least a transaction adjustment, a transaction refund, or a transaction settlement; and
    perform at the payment processor system the request using the token.

21. A method for providing secure transactions, the method comprising:
    receiving an identifier of a financial account at a payment processor system in connection with a purchase transaction;
    transmitting the identifier of the financial account to a financial instrument account issuer system to obtain authorization to use funds associated with the financial account to conduct the purchase transaction;
    receiving an authorization from the financial instrument account issuer system to use funds associated with the financial account to conduct the purchase transaction;
    generating a token linked with the identifier of the financial account at the payment processor system;
    storing the identifier of the financial account and the token securely at the payment processor system;
    transmitting the token to at least a merchant system or the financial instrument account issuer system where the token replaces the identifier of the financial account;
    using the token at the merchant system, the financial instrument account issuer system or the payment processor system to perform at least one operation selected from a group consisting of: settlement, reconciliation, adjustment, refund, chargeback, analytics, and anti-fraud.

* * * * *